June 1, 1965 W. P. VAN DEN BLINK ETAL 3,187,157
STUD WELDING GUN
Original Filed June 6, 1958

INVENTORS
WILLEM P. VAN DEN BLINK
KAREL C. TER HAAR
EELKE H. ETTEMA
BY
Frank R. Dufour
AGENT 3,187,157
STUD WELDING GUN
Willem Pieter van den Blink, Karel Christiaan ter Haar, and Elke Herman Ettema, all of Utrecht, Netherlands, assignors to North American Philips Company Inc., New York, N.Y., a corporation of Delaware
Original application June 6, 1958, Ser. No. 740,438, now Patent No. 3,021,418, dated Feb. 13, 1962. Divided and this application Oct. 5, 1961, Ser. No. 151,118
Claims priority, application Netherlands, June 12, 1957, 218,074
3 Claims. (Cl. 219—98)

This invention relates to stud-welding guns.

This application is a division of application Serial No. 740,438, now Patent No. 3,021,418.

It has been found that, in order to obtain satisfactory welding results, it is very important to hold the slag-building body well centered with respect to the bolt or stud to be fastened by welding.

In accordance with the invention the body is held by a more or less pinching fit between the inner wall of the body proper and the side surface of the bolt, stud or the like, on the said surface prior to the welding operation.

Thus the body can be held on the bolt or stud in a satisfactorily centered position without the need for use of particular members, for example cardboard cylinders on the body itself. Therefore, reference is made here to the inner wall of the body "proper."

The desired pinching fit may be obtained in various ways. When the welding bolt or stud is provided with a shoulder, against which the body can butt, the side surface of the stud below this shoulder may be roughened or be provided with small extensions. The latter may, for example, be obtained by providing longitudinal grooves in this side surface. As an alternative, the bolt or stud may be provided with a truncated cone surface, on which the slag-building body fits pinchingly.

As a further alternative, the inner surface of the annular, slag-building body may have a conical fitting surface, for example at an angle of 5°. In an efficient embodiment of this feature the inner side of the ring may have two conical fitting surfaces in a manner such that the longitudinal section of the ring is substantially symmetrical. This construction is practical, since in this case the ring can be positioned with either of its ends on the bolt or stud. With these constructions the bolt or stud need not be provided with a shoulder.

A further possibility of obtaining a suitable fit between the slag-building, annular body and the stud or bolt consists in that to the inner surface of the ring a layer of metal or of other material is applied, for example by spraying. This is capable of bridging the tolerances.

It may, moreover, be desirable to hold the annular slag-building body centered with and somewhat more tightly on the bolt or stud, particularly before it is positioned on the work piece. This applies especially when the ring fits detachable to the stud. This may be achieved by using a suitable construction of the welding gun or the like employed for welding the bolt or stud to the work piece. In accordance with the invention the gun or the like is provided with a member by which an annular, slag-building body or ferrule can be held temporarily on a surface of the bolt or stud and which is moved away from the body or is detachable from this body, when this occupies its correct position relative to the work piece.

In a practical embodiment of this construction provision is made of a support which has an axially movable terminal, which has a preferably resilient extension adapted to urge an annular, slag-building body provided on a welding bolt or stud against the side surface of the bolt or stud, the said axially movable terminal being guided in a manner such, for example by means of an oblique slot and a stud, in the support, that the extension secured thereto, during the axially inward movement, performs at the same time a pivotal motion away from the annular body.

Embodiments of the invention will now be described with reference to the drawing.

In the drawing FIG. 1 is a view, partly a longitudinal sectional view of a welding stud, on which an annular, slag-building body is arranged in the manner according to the invention.

Figure 1:
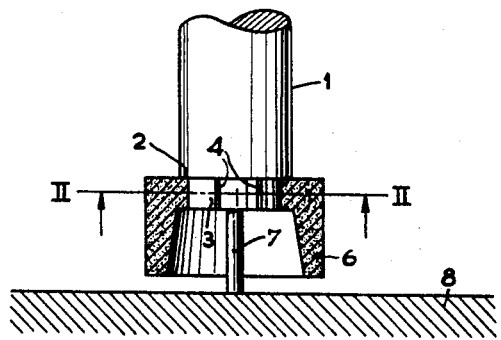

The welding stud 1 of FIG. 1 has a shoulder 2, below which lies a surface 3, which is cylindrical in this case and in which longitudinal grooves 4 are milled in a manner such that burrs 5 are formed; around this surface fits rather tightly an annular, slag-building body 6. From the end surface of the cylinder 3 protrudes a stud 7, which serves to initiate the arc between the stud 1 and the work piece 8.

Figure 6:
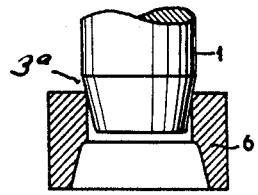
FIGS. 5 and 6 are longitudinal sectional views of further embodiments of the invention.
Figure 2:
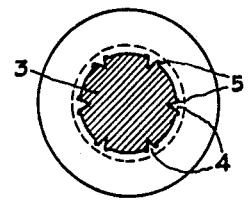
FIG. 2 is a sectional view taken on the line II—II of FIG. 1.
Figure 5:
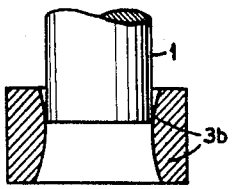

Under certain conditions the grooves 4 may be omitted. The cylindrical surface 3 may have the form of a truncated cone $3^a$, as is shown in FIG. 6. Then the shoulder 2 may be omitted. As an alternative, the stud 1 may be a simple cylinder without shoulder (FIG. 5), the ring 6 having in this case at least one conical part $3^b$ on the inner surface. The use of two conical surfaces $3^b$, as is shown in FIG. 5, is efficient, since, when arranging the ring 6, it is not necessary to observe which end is used.

Figure 3:
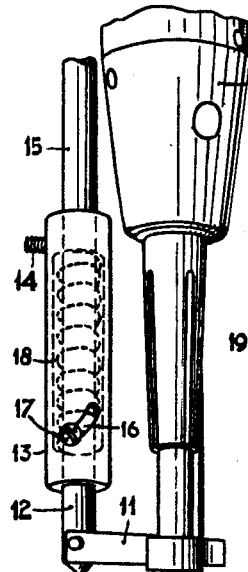
FIG. 3 is a perspective view of the lower part of a welding gun, provided with a device according to the invention.
Figure 4:
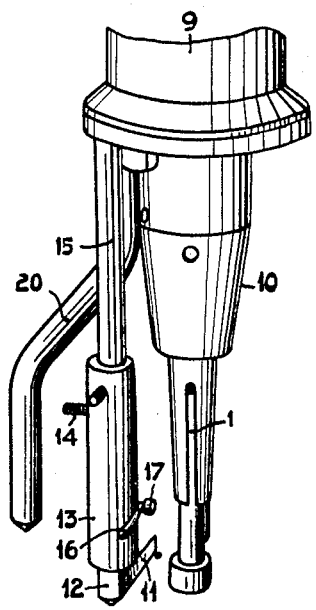
FIG. 4 shows the assembly of FIG. 3 under a different viewing angle.

In order to temporarily hold the slag-building body or ferrule 6 in position, a detachable connection between the ring 6 and the cylinder 3, the device shown in FIGS. 3 and 4 may be used.

The gun 9 has a holder 10 for a welding stud 1, which may be constructed as shown in FIG. 1 and on the operative end of which is arranged a slag-building body or ring 6 as shown in FIG. 1 so as to be detachable. This ring 6 is pressed tight temporarily on the cylinder 3 by a blade spring 11, which is secured to a pin 12, which protrudes from a support 13, which is adjustable in the direction of height relative to a rod 15 by means of a screw 14, this rod being secured to the gun 9.

The support 13 has an oblique slot 16. Through this slot projects a screw 17, which is secured in the pin 12. In the support 13 is provided a screw spring 18 (shown in dotted lines), which urges the pin 12 to the outside.

The gun has, furthermore, legs 19 and 20.

When the gun is placed with these legs on the work piece 8, the pin 12 is urged to the inner side along the guide slot 16 against the action of the spring 18. Then the blade spring 11 pivots away from the ring 6, which has then arrived at the operative position relative to the work piece and which need no further holdings. The pivotal motion of the spring is, moreover, important to protect the spring from burning during the welding operation.

What is claimed is:

1. A stud-welding gun for attaching a stud to a workpiece with the aid of a slag-building body positioned on the operative end of the stud, comprising means for holding the stud, a member movably supported on said means and having an operative position in which it engages the slag-building body to hold the same against the stud and an inoperative position spaced therefrom, resilient means urging said member into the operative position, and means actuated as the gun is positioned on the workpiece to place said member in the inoperative position when the gun is operatively positioned with respect to the workpiece.

2. A stud-welding gun for attaching a stud to a workpiece with the aid of a slag-building body positioned on the operative end of the stud, comprising means for holding the stud, a member rotatably supported on said means and having an operative position in which it engages the slag-building body to press the same against the stud and an inoperative position spaced therefrom, a spring urging said member into the operative position, and means to rotate said member into the inoperative position including an actuating member movably mounted on said first means and arranged to be actuated as the gun is positioned thereon and fully actuated when the gun is operatively positioned with respect to the workpiece.

3. A stud-welding gun for attaching a stud to a workpiece with the aid of a slag-building ferrule positioned on the operative end of the stud, comprising means for holding the stud in an axial direction, a support secured to said means and provided with an oblique slot, an actuating member axially movably mounted on said support with one end arranged to be contacted by the workpiece and thereby be moved in said axial direction as the gun is operatively positioned on the workpiece, a pin secured to said actuating member and extending into said slot to thereby cause the actuating member to rotate when moved in said axial direction, a ferrule-holding lever secured at one end to said actuating member and having an operative ferrule-holding position with the other end adjacent the axis of the gun, and a spring acting on said actuating member to urge said lever into its operative position.

References Cited by the Examiner

UNITED STATES PATENTS

| 2,416,915 | 3/47 | Evans | 219—98 |
| 2,761,957 | 9/56 | Sholle | 219—98 X |

RICHARD M. WOOD, *Primary Examiner.*